United States Patent [19]

Dixon

[11] Patent Number: 4,703,843
[45] Date of Patent: Nov. 3, 1987

[54] APPARATUS FOR HANDLING PALLET-SUPPORTED WORKPIECES

[75] Inventor: Paul H. Dixon, Belvidere, Ill.

[73] Assignee: Dixon Automatic Tool, Inc., Rockford, Ill.

[21] Appl. No.: 864,417

[22] Filed: May 19, 1986

[51] Int. Cl.[4] ............................................. B65G 47/00
[52] U.S. Cl. .................................. 198/345; 198/463.4; 193/35 A
[58] Field of Search ...................... 198/345, 463.4, 633, 198/634; 193/35 A, 40; 29/1 A, 33 P, 563; 104/249, 250

[56] References Cited

U.S. PATENT DOCUMENTS

| | | | |
|---|---|---|---|
| 3,285,195 | 11/1966 | Babson | 104/252 |
| 3,696,756 | 10/1972 | Elmore et al. | 198/345 |
| 3,722,656 | 3/1973 | Loomis, Jr. et al. | 198/19 |
| 4,611,704 | 9/1986 | Burgess | 198/345 |

FOREIGN PATENT DOCUMENTS 72869  6/1979  Japan .................................... 198/345

Primary Examiner—Joseph E. Valenza
Attorney, Agent, or Firm—Leydig, Voit & Mayer, Ltd.

[57] ABSTRACT

Workpieces are supported on pallets which are advanced by a continuously driven power-and-free conveyor adapted to permit each pallet to dwell in a work station when the pallet is stopped in the work station during continued driving of the conveyor. As each pallet approaches the work station, it is gradually decelerated and cushioned by a swingable stop which, after stopping the pallet, is shifted transversely to lock the pallet rigidly in an accurately fixtured position in the work station. A single pneumatically operated actuator serves to shift the stop transversely from a position in which the stop catches a pallet to a position in which the stop fixtures the pallet and then to a position in which the stop releases the pallet.

18 Claims, 16 Drawing Figures

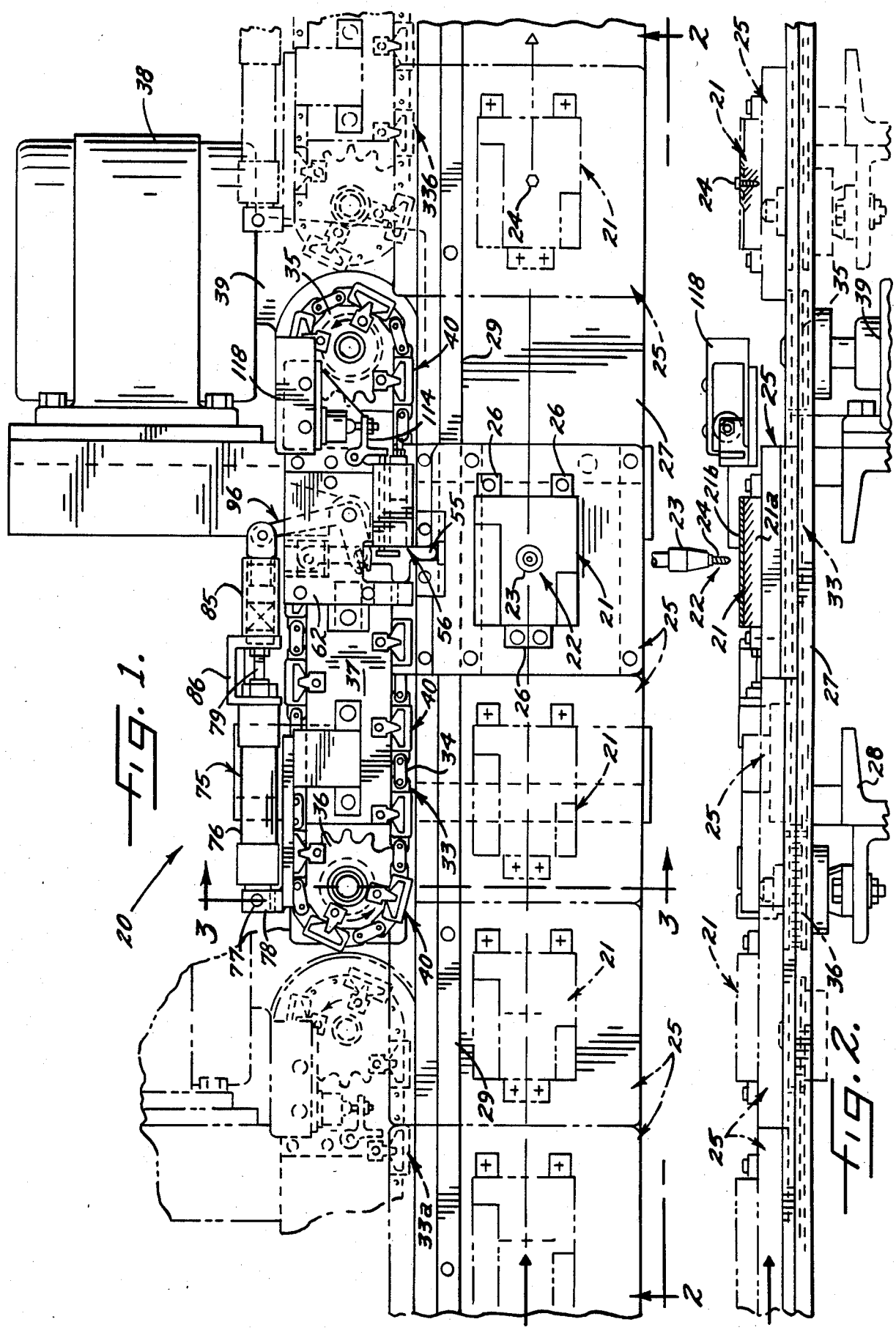

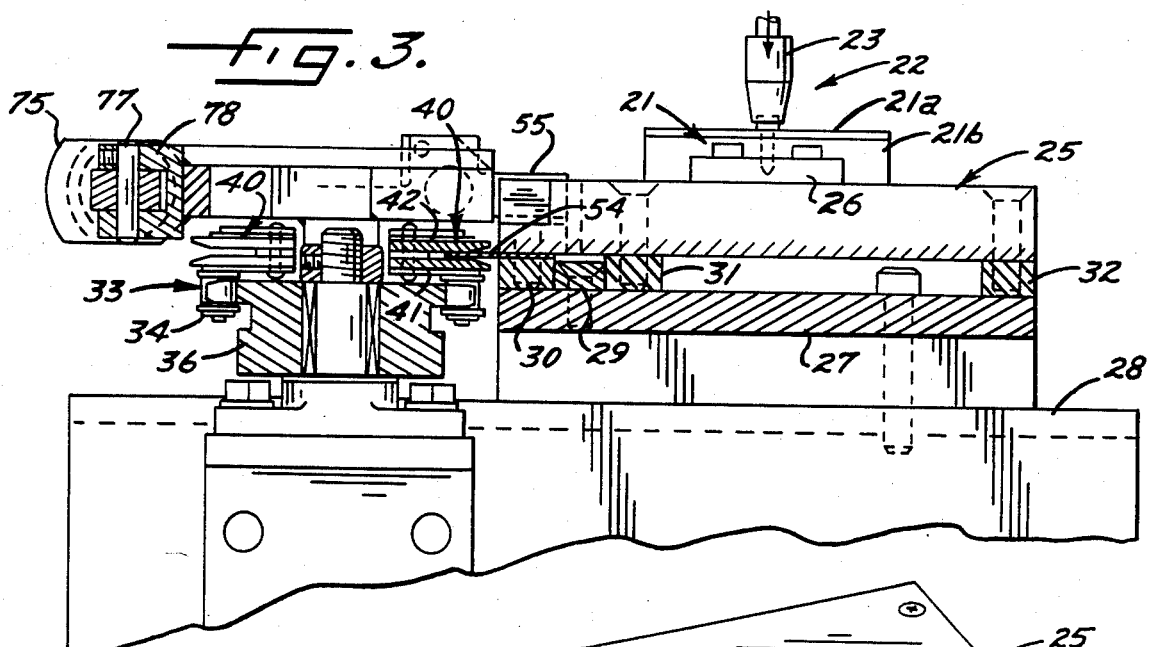
fig. 3.
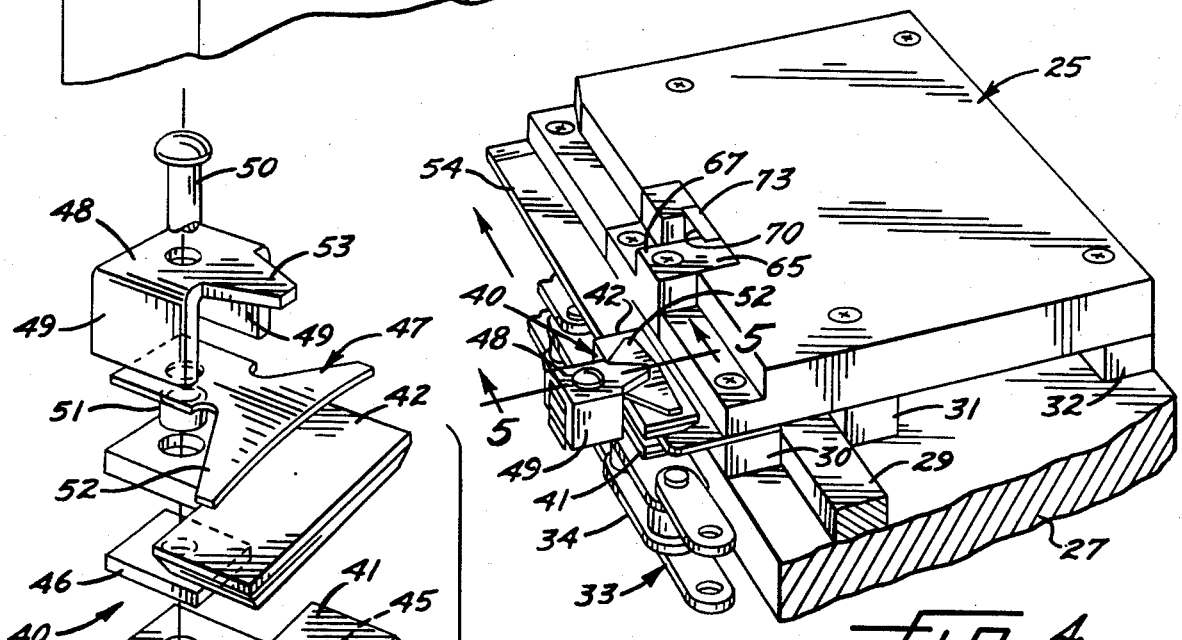
fig. 4.
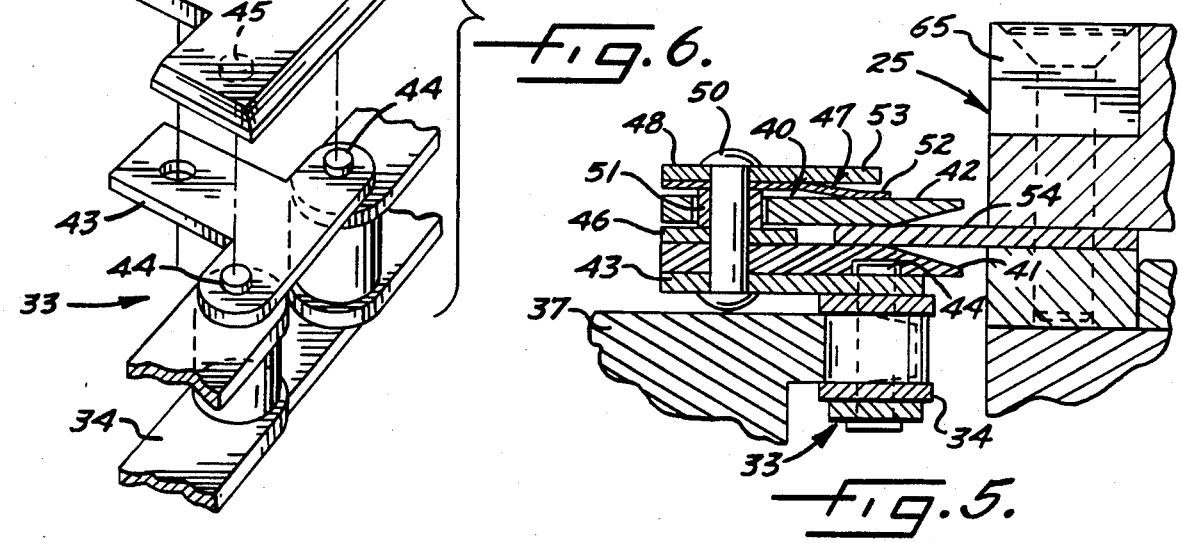
fig. 6.
fig. 5.

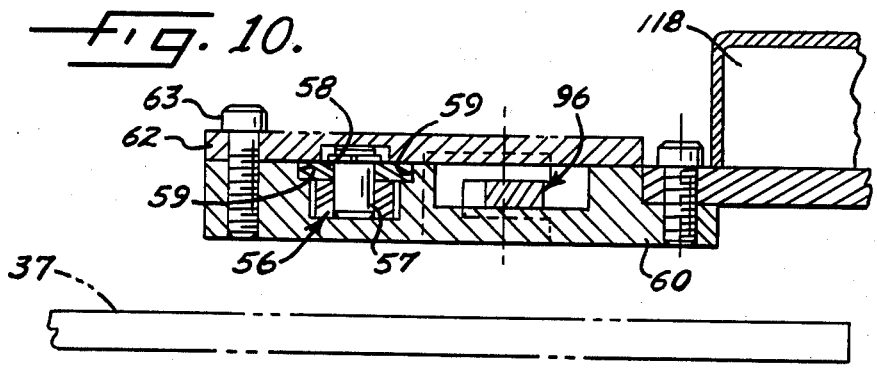
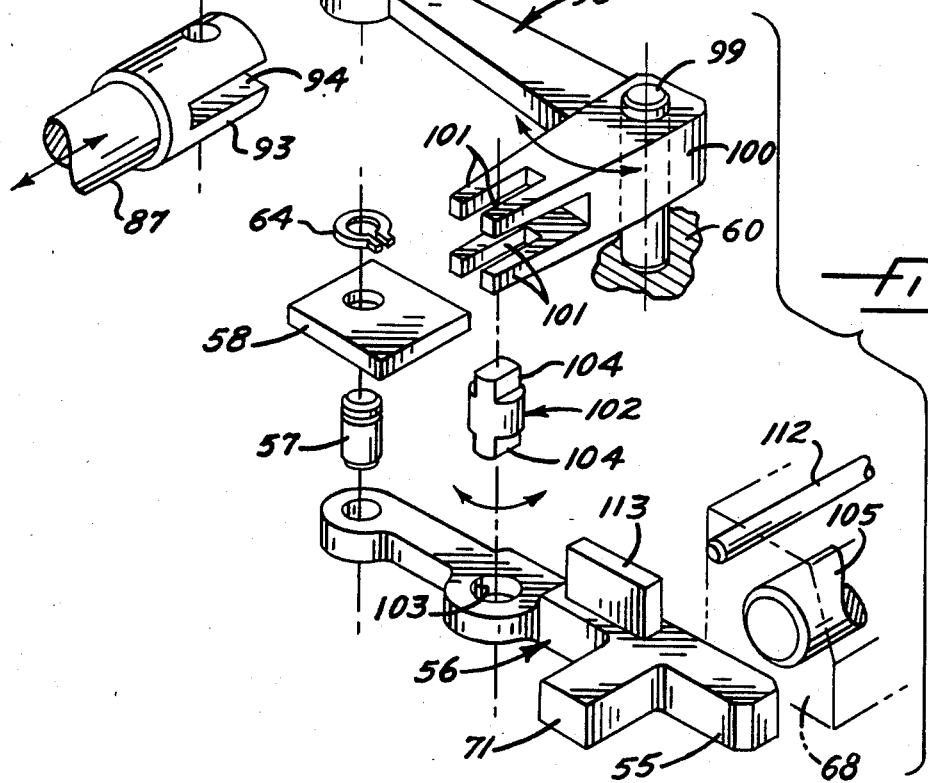

APPARATUS FOR HANDLING PALLET-SUPPORTED WORKPIECES

BACKGROUND OF THE INVENTION

This invention relates generally to apparatus for handling workpieces and, more particularly, to apparatus for handling workpieces which are supported on pallets adapted to be advanced by a power-and-free conveyor.

A power-and-free conveyor is a continuously driven conveyor which is adapted to advance a row of pallets along a predetermined path. When each pallet of the row is stopped in a work station, the conveyor allows the pallet to dwell in the work station while an operation is performed on the workpiece on the pallet and while driving of the conveyor continues.

SUMMARY OF THE INVENTION

The general aim of the present invention is to provide new and improved workpiece handling apparatus in which each pallet is gradually decelerated prior to being stopped in the work station and then is rigidly locked in a precisely fixtured position in the work station.

Another object of the invention is to provide apparatus in which a single stop of relatively simple construction acts both to effect cushioned deceleration of the pallets and to lock the pallets accurately in the work station.

A further object is to utilize a single stop to lock the pallets rigidly against movement in mutually coordinate directions in the work station thereby to enable precise but simple fixturing of the pallets.

Still another object is to utilize a single actuator to control transverse movement of the stop from a position in which the stop catches each pallet to a position in which the stop fixtures the pallet and then to a position in which the stop releases the pallet for advancement out of the work station.

The invention also resides in the novel and relatively simple construction of clamps forming part of the power-and-free conveyor and adapted to either advance the pallets or to slip frictionally along the pallets.

These and other objects and advantages of the invention will become more apparent from the following detailed description when taken in conjunction with the accompanying drawings.

BRIEF DESCRIPTION OF THE DRAWINGS

FIG. 1 is a top plan view of new and improved workpiece handling apparatus incorporating the unique features of the present invention.

FIG. 2 is a front elevational view as taken along the line 2—2 of FIG. 1.

FIG. 3 is an enlarged fragmentary cross-section taken substantially along the line 3—3 of FIG. 1.

FIG. 4 is a perspective view of a pallet and of a portion of the power-and-free conveyor.

FIG. 5 is an enlarged fragmentary cross-section taken substantially along the line 5—5 of FIG. 4.

FIG. 6 is an exploded perspective view of a portion of the power-and-free conveyor.

FIGS. 8, 9, 10 and 11 are fragmentary cross-sections taken substantially along the lines 8—8, 9—9, 10—10 and 11—11, respectively, of FIG. 7.

FIG. 12 is an exploded perspective view of the stop and of part of the actuating mechanism for moving the stop.

DETAILED DESCRIPTION OF THE PREFERRED EMBODIMENT

Figure 7:
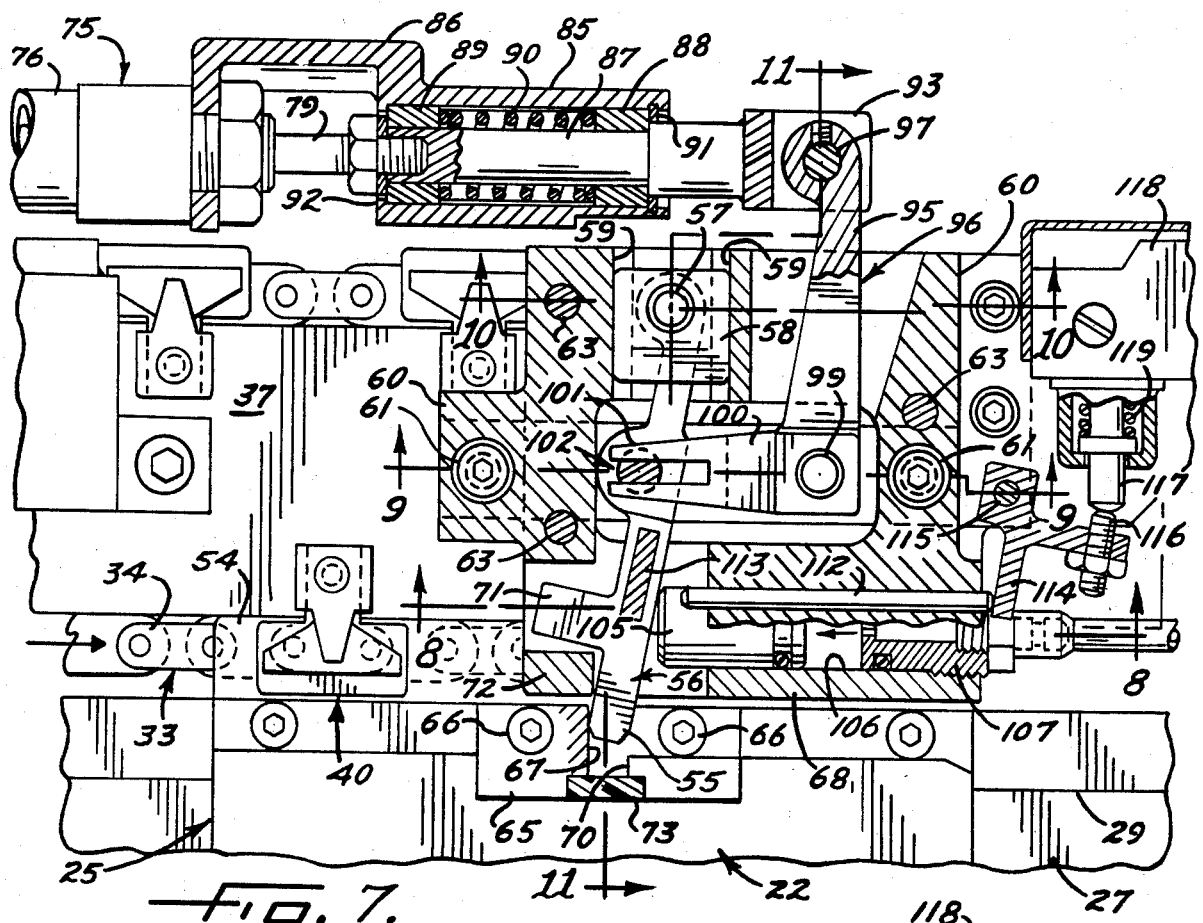
FIG. 7 is an enlarged top plan view of a portion of the apparatus shown in FIG. 1 and shows the stop in position to effect deceleration of a pallet, certain parts of the apparatus being broken away and shown in section.

As shown in the drawings for purposes of illustration, the invention is embodied in apparatus 20 for handling workpieces 21 and specifically in apparatus for advancing a series of workpieces along a predetermined path through a work station 22 where an operation is performed on the workpieces. In this specific instance, each workpiece has been shown as consisting of a lower block 21a (FIG. 2) and an upper plate 21b. At the work station 22, a power-operated screwdriver 23 of the type shown in Dixon U.S. Pat. No. 3,675,302 acts to drive a screw 24 through the plate 21b and into the block 21a and thereby fasten the two together to form a unitary assembly 21. It will be appreciated that many other workpieces different from those specifically shown may be handled by the apparatus and that many varied operations may be performed at the work station 22.

Herein, the workpieces 21 are carried by and are fixtured on a row of end-to-end pallets 25 which support the workpieces as the latter are advanced through the work station 22. Each pallet comprises a generally flat plate whose upper side carries suitable fixturing clamps 26 (FIGS. 1 and 3) for holding the workpiece rigidly in a predetermined position on the pallet. To support the pallets to advance through the work station 22, a fixed track 27 (FIGS. 1, 3 and 4) mounted on a stationary frame 28 underlies the pallets and extends through the work station 22 along the path of advance of the row of pallets. To guide the pallets along such path, guide means in the form of an elongated rail 29 (FIG. 4) is fixed to and extends along the upper side of the track and fits slidably between two transversely spaced guide means or rails 30 and 31 rigid with and depending from the underside of each pallet 25. A third rail 32 on the underside of each pallet 2 is spaced transversely from the rails 30 and 31 and coacts with the latter to hold the underside of the pallet in vertically spaced relation with the upper side of the track 27.

Advance of the pallets 25 through the work station 22 is effected by a power-and-free conveyor 33 (FIG. 1) which is located alongside the track 27. The conveyor comprises a roller chain 34 trained around driving and driven sprockets 35 and 36 rotatably supported by the frame 28 and spaced from one another along the track 27. Between the sprockets, the chain 34 is guided by a plate 37 (FIGS. 7 and 11) which is secured rigidly to the frame. A drive motor 38 (FIG. 1) with a speed reducer 39 is attached to the frame and is operably connected to the driving sprocket 35 to rotate that sprocket in a counterclockwise direction and cause the pallets to advance from left-to-right as viewed in FIG. 1.

Advantageously, the conveyor 33 includes unique clamps 40 which normally grip the pallets 25 to advance the pallets along the track 27 and through the work station 22 but which automatically slip frictionally along each pallet when the latter is stopped and thereby allow the pallet to dwell in the work station while driving of the chain 34 continues. The clamps are spaced from one another along the chain 34 and as shown most clearly in FIGS. 5 and 6, each clamp includes a pair of lower and upper jaws 41 and 42 which are adapted to move toward and away from one another to either grip the pallets tightly or to slip frictionally along the pallets. The lower jaw 41 of each clamp 40 is a generally T-shaped plate and overlies a T-shaped connecting link 43 (FIG. 6) which is secured between two adjacent links of the chain 34 by vertical pins 44. Those pins dowel into recesses 45 in the lower side of the jaw 41 and prevent the jaw from shifting edgewise relative to the connecting link 43.

The upper jaw 42 of each clamp 40 is shaped generally the same as the lower jaw 41 and is spaced vertically from the latter by a thin block 46 (FIG. 6) which is sandwiched between the tongue portions of the two T-shaped jaws. A generally T-shaped leaf spring 47 overlies the upper jaw 42 and is held in place by a clamp 48 which prevents the spring and the upper jaw 42 from shifting edgewise relative to the lower jaw 41. As shown in FIG. 6, the clamp 48 is of inverted U-shaped configuration and is formed with a pair of depending ears 49 which straddle the tongue portions of the spring 47, the jaws 42 and 41 and the connecting link 43. A rivet 50 extends through holes in such tongue portions and also through a hole in the spacer block 46. Encircling the rivet and sandwiched between the spacer block 46 and the spring 47 is a spacer bushing 51 which is disposed in the hole in the tongue portion of the upper jaw 42 and which holds the tongue portion of the spring 47 against the lower side of the clamp 48 and in upwardly spaced relation from the tongue portion of the upper jaw.

As shown most clearly in FIG. 5, the leaf spring 47 includes an elongated portion 52 bent downwardly from the tongue portion of the spring and biased downwardly against the upper jaw 42. The spacer block 46 serves as a fulcrum for the upper jaw 42 while the spacer bushing 51 allows limited pivoting of the upper jaw on the rivet 50 and toward and away from the lower jaw 41. As a result, the upper jaw is pressed downwardly toward the lower jaw by the spring 47 but is permitted to pivot upwardly relative to the lower jaw. The spacer block 46 prevents the upper jaw 42 from completely closing against the lower jaw 41 while a lug 53 (FIG. 6) on the clamp 48 overlies the elongated portion 52 of the spring 47 to limit upward pivoting of the upper jaw and prevent overstressing of the spring.

The jaws 41 and 42 of the clamps 40 are adapted to frictionally grip elongated lips 54 (FIGS. 4 and 5) carried by the pallets 25 adjacent the guide rails 30 thereof, each lip extending along the entire length of the pallet and overlying the conveyor chain 34. The jaws of the clamps straddle the lip of each pallet and, as long as the pallet is free to move along the track 27, the springs 47 of the clamps press the jaws into tight engagement with the lip to cause the jaws to advance the pallet. If a given pallet is stopped, however, the springs yield to enable the upper jaws 42 of the clamps to pivot upwardly from the lower jaws 41 and thereby permit the clamps simply to slip frictionally along the lips 54 without advancing the pallet. The leading edges of the jaws 41 and 42 are beveled inwardly as shown in FIG. 6 so that the trailing end of the lip 54 of a stopped pallet may cam the jaws apart and thereby permit the jaws to straddle the lip.

With the foregoing arrangement, the clamps 40 of the continuously driven conveyor 33 advance successive pallets 25 into the work station 22 and then slip frictionally on each pallet when such pallet is stopped in the work station. Trailing pallets are stopped by the pallet in the work station and thus the clamps also slip with respect to those pallets. After the screw 24 has been driven into the workpiece 21 on the pallet stopped in the work station 22, that pallet is released from a stopped condition in the work station and, at such time, the clamps again tightly grip the pallets to advance the completed pallet out of the work station and to advance the next pallet into the work station. Conveyors 33a and 33b (FIG. 1) identical to the conveyor 33 may be located upstream and downstream, respectively, of the conveyor 33, the conveyor 33a serving to feed pallets to the conveyor 33 while the conveyor 33b takes control of and advances the pallets as the pallets move past the downstream sprocket 35 of the conveyor 33. The track 27 may be of an oval or race track configuration and various conveyors similar to the conveyor 33 may be spaced around the entire track to keep a continuous flow of intermittently stopped pallets circulating around the track.

In accordance with the primary aspect of the present invention, each pallet 25 which approaches the work station 22 is gradually decelerated and cushioned by a unique stop 55 (FIG. 7) which, after stopping the pallet in the work station, locks the pallet rigidly in an accurately fixtured position so as to insure that the workpiece 21 is properly located to accept the screw 24. As will become more apparent subsequently, the use of the single stop 55 for cushioning, stopping and fixturing each pallet significantly simplifies the structure at the work station and completely avoids the need of separate stopping and fixturing devices moved by separate actuators whose operation must be coordinated in timed relation with one another.

More specifically, the stop 55 herein is defined by an elongated locator bar or finger which is part of a carrier in the form of a lever 56 (FIGS. 7 and 12). The stop lever 56 is disposed in a horizontal plane and is pivotally mounted by a vertical pivot pin 57 to swing back and forth about an upright axis on a slide block 58. As shown in FIGS. 7 and 10, the slide block is supported to reciprocate transversely toward and away from the track 27 by guideways 59 formed in a mounting base 60 underlying the slide block and secured rigidly by screws 61 to the upper side of the guide plate 37 for the chain 34. A cover plate 62 (FIG. 10) is removably attached to the mounting base 60 by screws 63 and overlies the slide block 58 to captivate the latter in the guideways 59. In addition, a snap ring 64 (FIG. 12) encircles the pivot pin 57 and helps hold the pivot pin, the slide block 58 and the stop lever 56 in assembled relation.

As each pallet 25 approaches the work station 22, the stop lever 56 is positioned as shown in FIG. 7 to cause the stop finger 55 to lie in the path of a stop block 65 which is secured by screws 66 to the upper side of each pallet immediately above the guide rail 30 and about midway along the length of the pallet. When a stop shoulder 67 on the stop block 65 engages the stop finger 55, continued movement of the pallet into the work station 22 causes the stop lever 56 to pivot counterclockwise about the pin 57 and to move generally along the path of the pallet through a limited distance in the direction of travel of the pallet. As an incident thereto, the stop finger 56 cushions the pallet to a gradual stop in a manner to be described subsequently.

Movement of the pallet 25 into the work station 22 and counterclockwise swinging of the stop lever 56 continue until the stop finger 56 is disposed at right angles to the pallet and is stopped by a stop shoulder 68 (FIGS. 13 and 16) on the mounting base 60. As the finger 55 is stopped, it acts to stop the pallet 25 in the work station 22. Thereafter, the clamps 40 of the conveyor 33 simply slip frictionally past the lip 54 of the pallet to allow the pallet to dwell in the work station.

Figure 13:
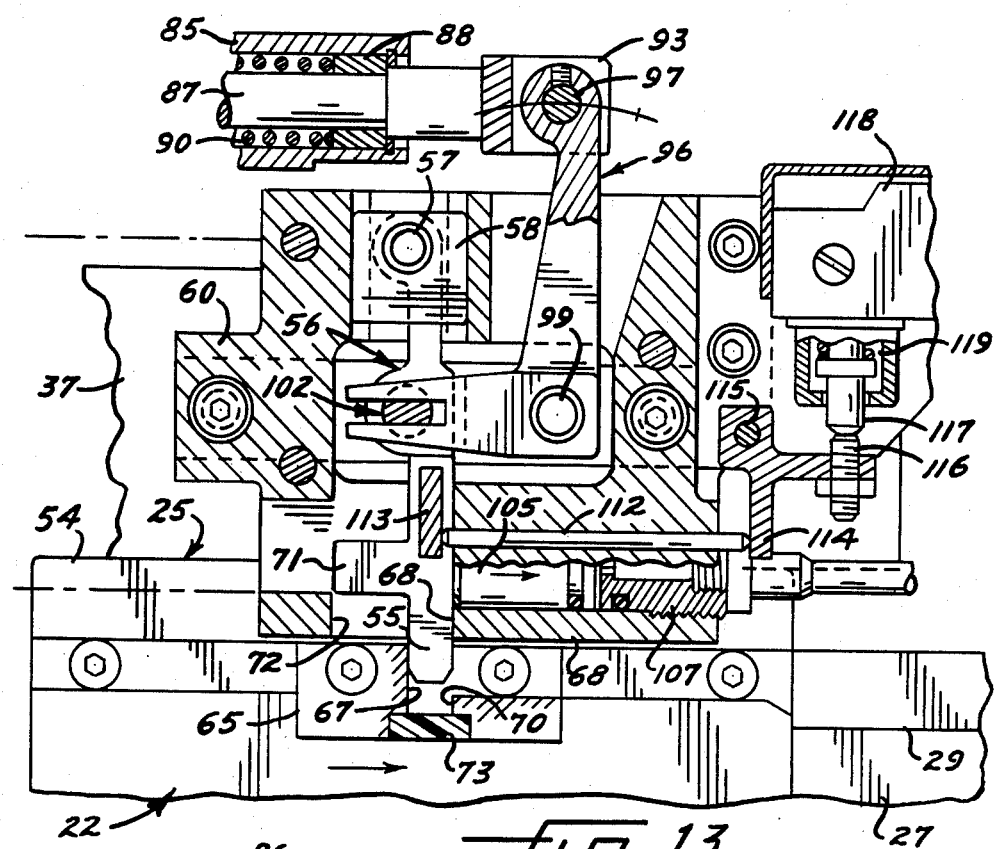
FIGS. 13, 14 and 15 are views similar to FIG. 7 but show the stop in successively moved positions.
Figure 14:
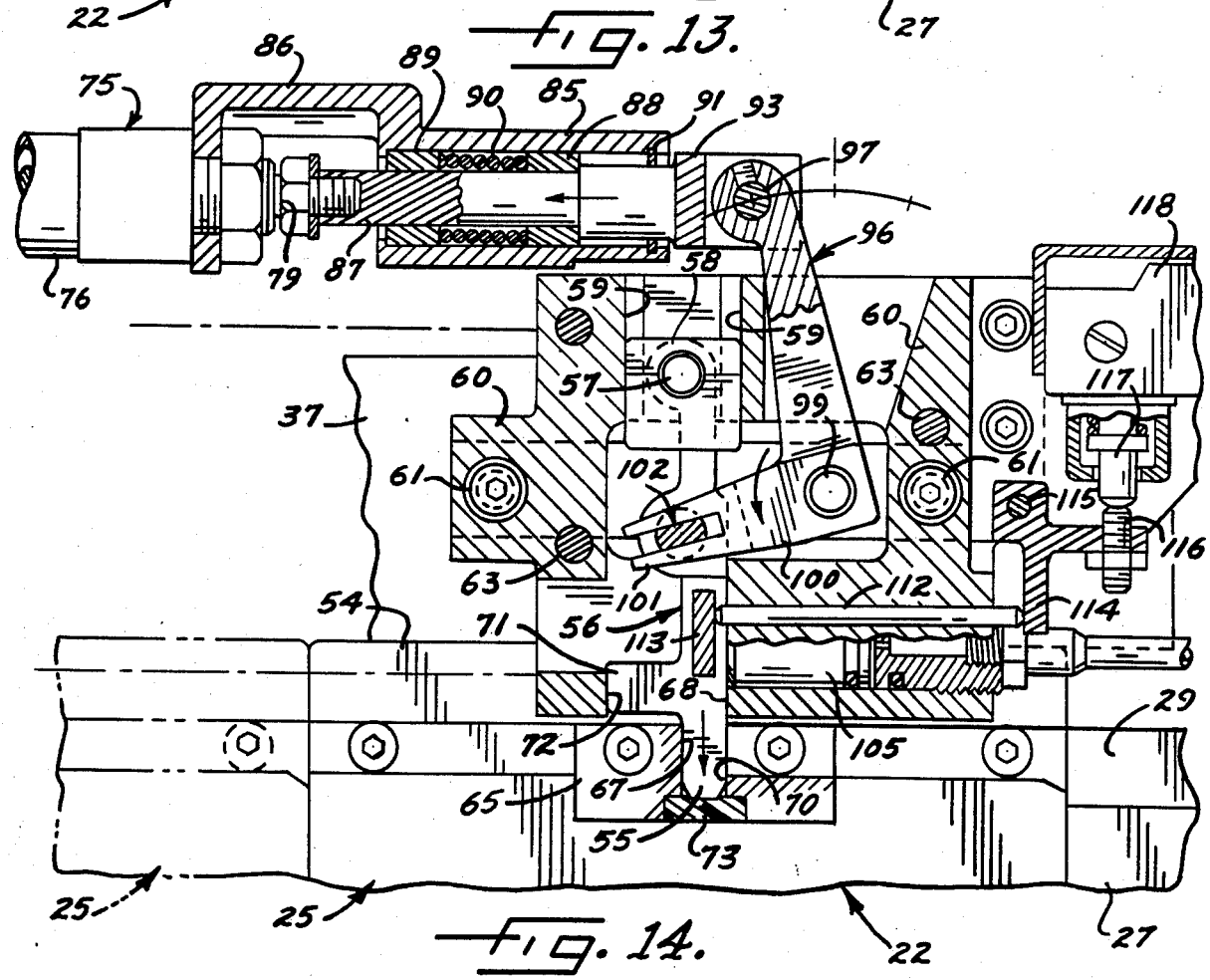

Immediately after the pallet 25 is stopped in the work station 22, the stop finger 55 and the slide 57 are shifted transversely outwardly along a linear path from the position shown in FIG. 13 to that shown in FIG. 14 to cause the stop finger to move further into the path of the pallet and to lock the pallet in a rigidly fixtured position in the work station. To effect the fixturing, the stop block 65 on the pallet 25 is formed with a locator or socket 70 (FIGS. 13 and 14) disposed outwardly of the stop shoulder 67. The socket 70 is complementary in cross-sectional size and shape to the cross-sectional size and shape of the stop finger 55 and thus the stop finger dowels tightly but slidably into the socket when the stop finger is shifted outwardly from the position shown in FIG. 13 to the position shown in FIG. 14. As an incident to such shifting, a tongue 71 on the stop lever 56 moves into engagement with a block 72 on the mounting base 60. The block 72 coacts with the opposing stop shoulder 68 to prevent any pivoting whatsoever of the stop lever 56 when the finger 55 is in the socket 70 of the pallet. The clamps 40 slipping frictionally along the lip 54 of the stopped pallet force the trailing side of the socket 70 tightly against the finger and thus any longitudinal clearance between the finger and the socket is taken up so as to fixture the pallet in an accurate longitudinal position in the work station 22. In addition, the same stop finger 55 serves to lock the pallet rigidly in a transverse position in the work station. As shown in FIG. 14, the bottom of the socket 70 in the stop block 65 is equipped with a bumper 73 made of hard nylon. As the stop finger 55 is shifted outwardly, its free end engages and presses tightly against the bumper 73 to force the guide rail 30 of the pallet into tight face-to-face engagement with the opposing rail 29 of the track 27. As a result of such tight engagement, the pallet is locked rigidly in a precisely established transverse position in the work station 22.

Figure 15:
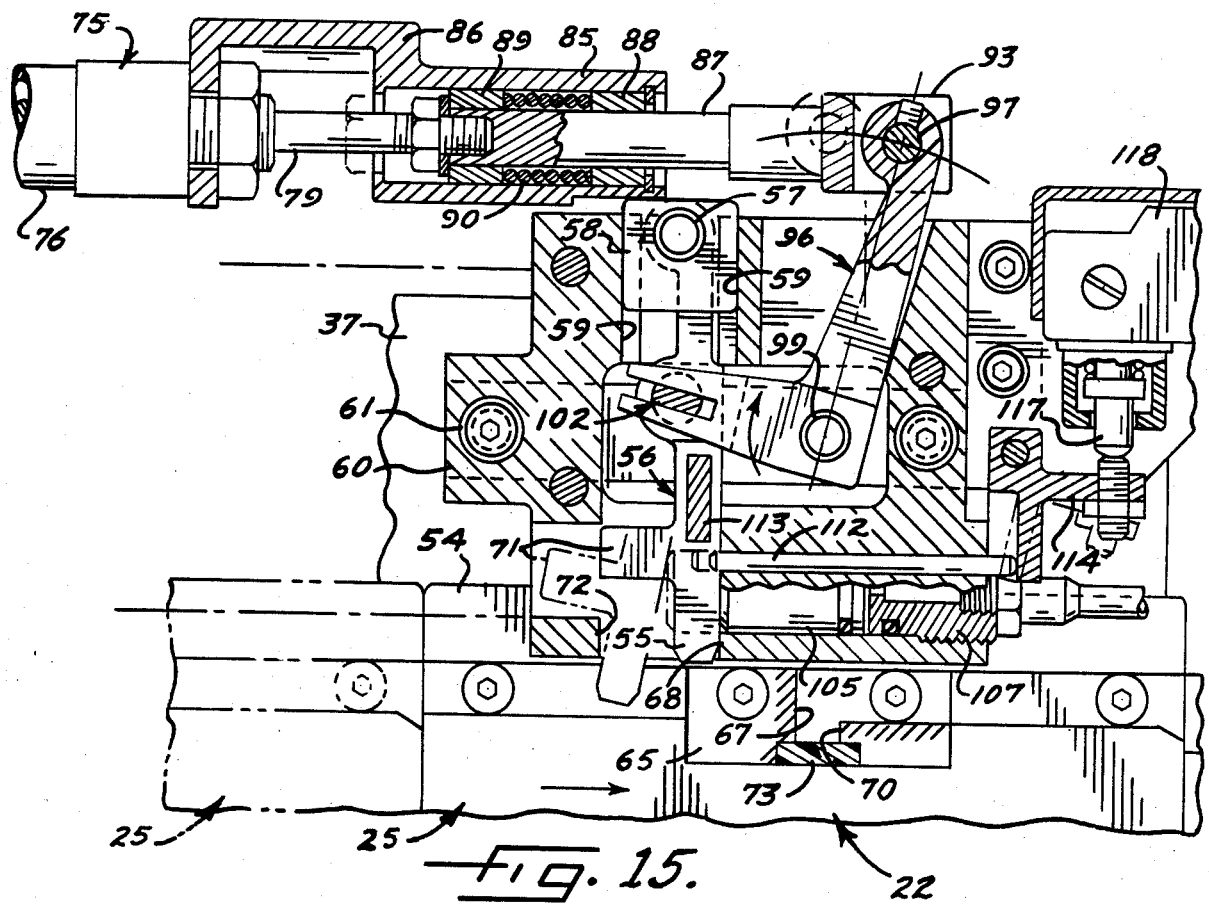

After the screw 24 has been driven in the workpiece 21 on the accurately fixtured pallet 25 in the work station 22, the stop finger 55 is retracted linearly out of the socket 70 and out of the path of the pallet to a position just clear of the stop shoulder 67 as shown in solid lines in FIG. 15. As a result, the pallet 25 in the work station is released by the stop finger and is immediately gripped tightly by the clamps 40 and advanced out of the work station. During such advance the stop lever 56 is swung clockwise about the pin 57 and generally along the path of the pallets in a direction opposite to the direction of travel of the pallets. At the same time, the lever is shifted transversely outwardly into the path of the pallets to bring the stop finger 56 back to the position shown in FIG. 7 and in phantom lines in FIG. 15 and back into position to catch the stop shoulder 67 of the next pallet.

To effect movement of the stop finger 55, a reversible fluid-operated actuator (herein, a pneumatic actuator 75) is operably connected to the lever 56. As shown in FIG. 1, the actuator 75 includes a cylinder 76 having one end pivotally connected at 77 to a mounting bracket 78 secured to the chain guide plate 37. Extending out of the other end of the cylinder is an elongated rod 79 which is connected to a piston 80 (FIG. 16) disposed within the cylinder. The rod is advanced out of the cylinder when a solenoid-operated valve 81 is actuated to admit pressurized air into the head end of the cylinder via an adjustable flow control valve 82. Retraction of the rod is effected when pressurized air is admitted into the rod end of the cylinder by way of a solenoid-operated valve 83 and an adjustable flow control valve 84. The valves 81 and 83 may be positioned to enable air to exhaust from both ends of the cylinder 76 as shown schematically in FIG. 16.

The free end portion of the cylinder rod 79 extends into a sleeve 85 (FIG. 7) which is anchored rigidly to the cylinder 79 by a mounting bracket 86. A rod-like extension 87 is connected to the cylinder rod and is guided for sliding within spaced bushings 88 and 89 which, in turn, are guided to slide within the sleeve 85. A coil spring 90 surrounds the extension rod 87 at a location between the bushings and is compressed against the bushings so as to urge the bushing 88 toward a snap ring 91 at one end of the sleeve and to urge the bushing 89 toward an annular retaining lip 92 at the opposite end of the sleeve.

Carried on the free end of the extension rod 87 is a clevis 93 (FIG. 12) which is slotted as indicated at 94 to receive the end portion of one arm 95 of a bellcrank 96. A pivot pin 97 extends through the clevis 93 and the arm 95 to connect the arm pivotally to the clevis, the pin being secured by a set screw 98. The bellcrank is pivotally supported on the mounting base 60 by a vertical pin 99 and its other arm 100 is connected to the stop lever 56 so as to shift the lever and the slide block 58 transversely inwardly and outwardly while permitting the lever to swing relative to the slide block about the pivot 57. For this purpose, the free end portion of the bellcrank arm 100 is formed with a pair of vertically spaced drive forks 101 which straddle the lever 56 about midway along the length thereof. A vertical drive pin 102 is rotatably received in a hole 103 in the lever and its ends are formed with driving flats 104 which are received within the forks 101. When the bellcrank 96 is pivoted about the pin 99, the forks 101 act against the flats 104 and shift the lever 56 transversely inwardly and outwardly as the pin 102 turns in the hole 103 and as the slide 58 moves linearly within the guideways 59. When the lever 56 is pivoted, the flats 104 of the drive pin 102 travel within the slots of the forks 101 and, at the same time, the pin 102 turns slightly within the hole 103.

Figure 8:
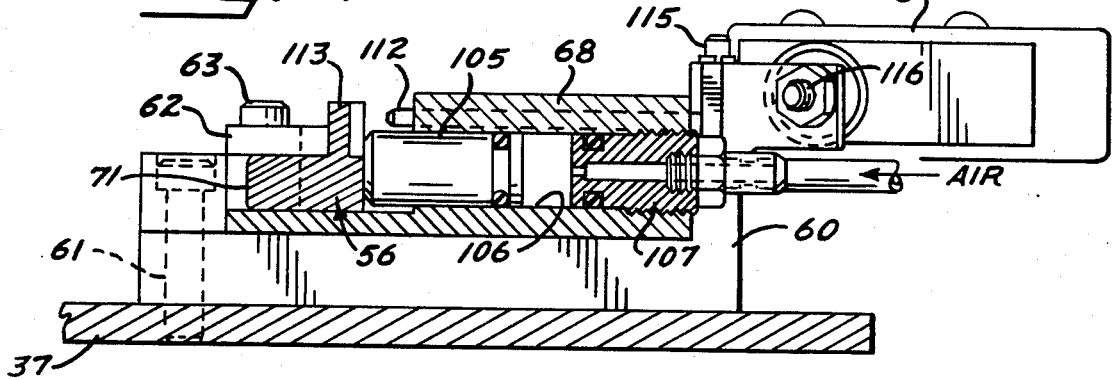
Figure 9:
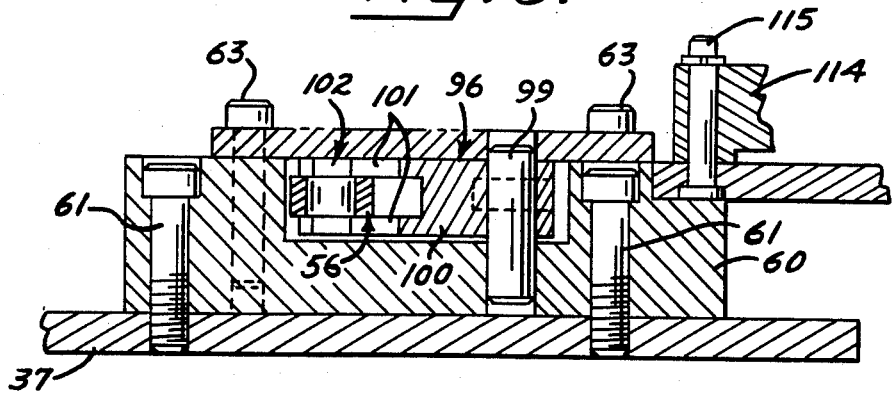
Figure 16:
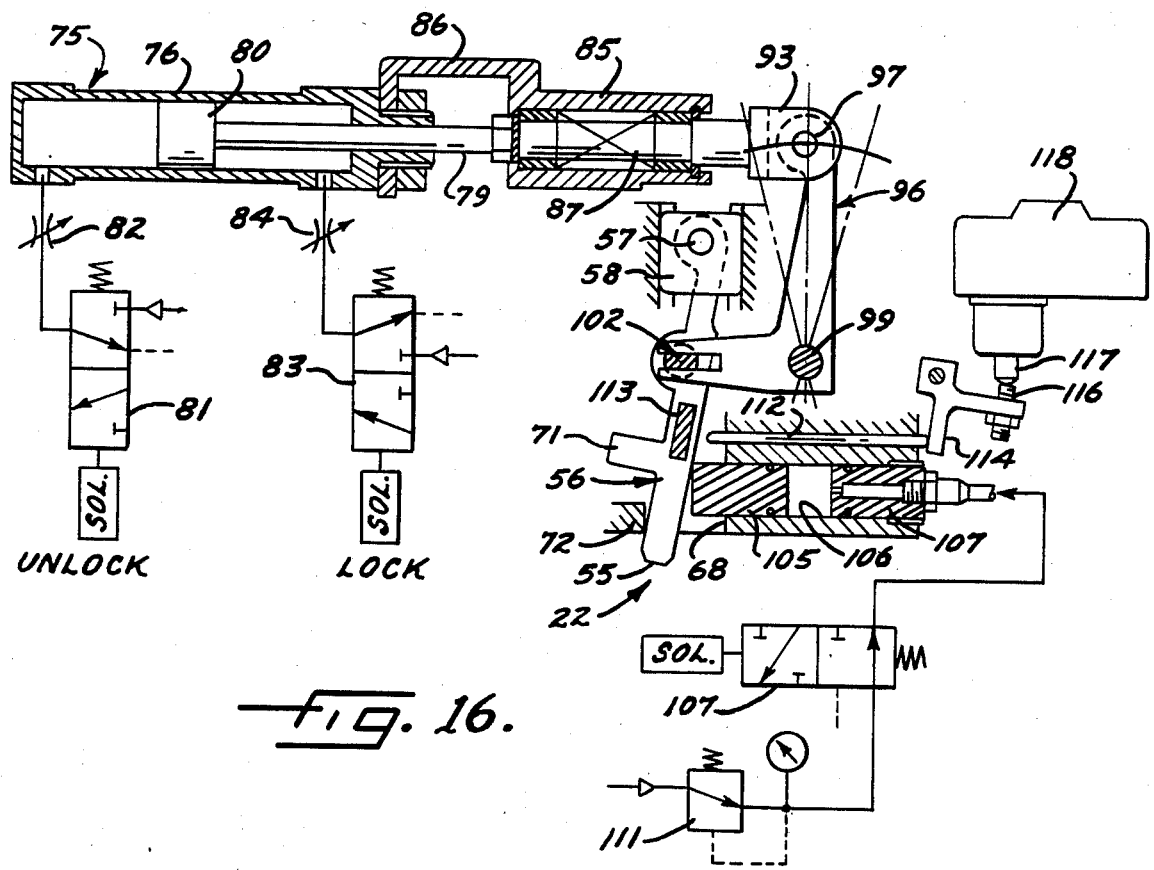
FIG. 16 a schematic view of the control system for the stop.

To cushion the stop finger 55 and effect gradual deceleration of the pallets 25 approaching the work station 22, a fluid-operated actuator in the form of a buffer piston 105 (FIG. 8) is mounted slidably in a cylinder or through-bore 106 in the mounting base 60 and is adapted to be biased out of one end of the bore and against the stop lever 56. As shown in FIG. 16, a fitting 107 is threaded into the other end of the bore 106 and is adapted to receive pressurized air by way of a solenoid-operated control valve 107 and at a pressure established by an adjustable pressure relief valve 111. In the other position of the valve 107, air is exhausted from the bore 106.

The apparatus 20 is completed by a sensing rod 112 (FIG. 7) which is slidably supported in the mounting base 60 adjacent the buffer piston 105. When the stop lever 56 is pivoted counterclockwise, one end of the sensing rod 112 is adapted to be engaged by a strike 113 which projects upwardly from the lever 56 at a location spaced inwardly from the free end of the stop finger 55. Such engagement causes the sensing rod to slide from left-to-right in the mounting base 60 and, during such sliding, the opposite end of the sensing rod pushes against and effects counterclockwise turning of a bellcrank 114 which is pivotally supported on the mounting base 60 at 115. A stud 116 is carried by the bellcrank 114 and acts against a plunger 117 of a limit switch 118, the plunger being biased outwardly by a coil spring 119. When counterclockwise pivoting of the stop lever 56 is stopped by the shoulder 68, the sensing rod 112 holds the bellcrank 114 in a position to cause the stud 116 to depress the plunger 117 and close the limit switch 118. When the stop lever 56 pivots clockwise, the coil spring 119 rests the plunger 117 to open the limit switch 118, to pivot the bellcrank 114 clockwise and to cause the bellcrank to push the sensing rod 112 from right-to-left.

To explain a typical cycle of operation, let it be assumed that the stop lever 56 is positioned as shown in FIGS. 7 and 16 and is located such that the stop finger 55 has just been engaged by the stop shoulder 67 of a pallet 25 approaching the work station 22, the stop lever having not yet been pivoted by the pallet. When the stop lever is in this position, the strike 113 is spaced from the sensing rod 112 and thus the spring 119 of the limit switch 118 forces the plunger 117 outwardly to open the switch. When the limit switch is open, the valve 107 is set to admit pressurized air into the bore 106 to force the buffer piston 105 toward and against the stop lever 56, the stop finger 55 engaging the stop block 72 of the mounting base 60 to limit clockwise pivoting of the stop lever. At the start of a cycle with the limit switch open, both valves 81 and 83 are set to exhaust air from both ends of the cylinder 76. As a result, the coil spring 90 acts against the bushings 88 and 89 in the sleeve 85 to push the bushings against the snap ring 88 and the retainer lip 89, respectively, and thereby hold the piston 80 in a neutral or substantially centered position in the cylinder 76 (see FIG. 16). When the piston is centered, the rods 79 and 87 act through the bellcrank 96 to hold the slide block 58 in an intermediate position in the guideways 59 as shown in FIGS. 7 and 16. With the slide block 58 in its intermediate position, the stop lever 56 is located so as to cause the stop finger 55 to clear the socket 70 of the incoming pallet 25 but to be positioned in the path of the stop shoulder 67 thereof.

As the pallet 25 advances from the position shown in FIG. 7 and toward the work station 22, the stop shoulder 67 pushes against the stop finger 55 and causes the lever 56 to pivot counterclockwise. The buffer piston 105, bearing against the opposite side of the stop lever, resists counterclockwise pivoting of the stop lever with a force determined by the pressure of the air in the bore 106 as established by the setting of the pressure relief valve 111. Accordingly, the pressure acting against the buffer piston serves as a cushion to cause the pallet to decelerate gradually as the pallet moves into the work station and pivots the stop lever counterclockwise.

When the stop lever 56 swings against the stop shoulder 68, it brings the pallet to a complete stop (see FIG. 13). As the stop lever swings toward the shoulder 68, the strike 113 on the lever engages the detecting rod 112 and pushes the latter from left-to-right, the detecting rod effecting closing of the limit switch 118 when the lever stops against the shoulder 68. When the limit switch closes, the valve 83 is shifted to admit pressurized air into the rod end of the cylinder 76 and thereby retract the rods 79 and 87. As a result, the bellcrank 96 is swung counterclockwise about the pivot 99 and acts through the drive pin 102 to shift the slide 58 outwardly to the position shown in FIG. 14 and thereby force the stop finger 55 into its fixturing position in the socket 70 in the pallet. Closing of the limit switch also shifts the valve 107 to exhaust the pressurized air in the bore 106 so as to relieve the pressure from the buffer piston 105 and reduce friction between the buffer piston and the stop lever 56 as the stop finger 55 is moved into its fixturing position.

As the stop finger 55 shifts to its fixturing position (FIG. 14), it dowels into the socket 70 in the pallet 25 and, at the same time, the lever 56 moves between the stop shoulder 68 and the stop block 72 and is captivated against swinging about the pivot 57. The trailing side of the socket 70 is forced tightly against the stop finger by virtue of the clamps 40 slipping frictionally on the lip 54 of the pallet. Moreover, the free end of the stop finger presses against the bumper 73 to force the rail 30 on the pallet outwardly against the rail 29 on the track 27 and take up transverse tolerance between the rails. Thus, the stop finger locks the pallet rigidly and with virtually zero tolerance in the work station 22 in both coordinate horizontal directions.

After the screw 24 has been driven into the workpiece 21, the screwdriver 23 produces a signal to shift the valve 83 to exhaust pressurized air from the rod end of the cylinder 76 and to shift the valve 81 to admit pressurized air into the head end of the cylinder. As a result, the rods 79 and 87 are advanced to pivot the bellcrank 96 clockwise and cause the latter to act through the drive pin 102 to retract the slide 58 and the stop finger 56 (see FIG. 15). The stop finger is retracted until it is just clear of the stop shoulder 67 on the pallet 25 so as to release the pallet to move out of the work station 22.

As the stop finger 55 clears the stop shoulder 67 on the pallet 25, the strike 113 on the lever 56 clears the detecting rod 112. As a result, the coil spring 119 of the limit switch 118 acts through the bellcrank 114 to shift the detecting rod across the top of the lever 56 and effect opening of the switch. As an incident thereto, the valve 81 is shifted to exhaust pressurized air from the head end of the cylinder 76 and stop further transverse retraction of the stop pin 55 and, at the same time, the valve 107 is shifted to admit pressurized air into the bore 106 and force the buffer piston 105 against the stop lever 56.

During retraction of the stop pin 55, the cylinder rod 79 acts against the bushing 89 and pushes the bushing within the sleeve 85 to compress the spring 90 as the rod 79 is extended (see FIG. 15). When the stop pin reaches its "clear" position and the valve 81 is shifted to exhaust pressurized air from the head end of the cylinder 76, the compressed spring 90 acts against the bushing 89 to slide the bushing reversely in the sleeve 85 to the neutral position shown in FIGS. 7 and 16. As a result, the bellcrank 96 is rocked counterclockwise through a short distance to shift the stop pin 55 transversely outwardly toward the position shown in solid lines in FIGS. 7 and 16 and in phantom lines in FIG. 15 so that the stop finger may be located in position to catch the stop shoulder 67 of the next pallet 25. During such shifting, the buffer piston 105 swings the stop lever 56 clockwise about the pivot 57 until the stop finger 55 engages the stop block 72. Accordingly, the stop finger is returned to its initial position (FIG. 7) preparatory to the start of the next cycle.

From the foregoing, it will be apparent that the present invention brings to the art new and improved workpiece handling apparatus 20 in which a single stop 55 of relatively simple construction is effective to cushion, stop and fixture the pallets 25 advanced by the power-and-free conveyor 33. The actuator 75 is the only actuator which is required to shift the stop transversely from a position (FIG. 7) in which the stop catches a pallet to a position (FIG. 14) in which the stop fixtures the pallet, then to a position (FIG. 15) in which the stop releases the pallet and finally back to the first position to catch the next pallet. Accordingly, the actuator 75 is simple and easy to control and its operation need be coordinated only with that of the buffer piston 105 which serves both to cushion each pallet and to restore the stop lever 56 angularly into position to cushion the next pallet.

The clamps 40 of the power-and-free conveyor 33 either tightly grip or slip frictionally along the lips 54 of the pallets 25 without need of any actuators for controlling the clamps. Moreover, frictional slipping of the clamps along the lip of each pallet stopped in the work station 22 tends to force the pallet into tight engagement with the stop finger 55 to take up longitudinal tolerance.

I claim:

1. Apparatus for handling workpieces and comprising a row of pallets each adapted to hold a workpiece, a continuously driven power-and-free conveyor, said conveyor being operable to advance said pallets along a predetermined path through a work station and being operable to allow said pallets to dwell along said path when the pallets are stopped during continued driving of said conveyor, said apparatus being characterized by means for causing each pallet to gradually decelerate as the pallet approaches said work station and for thereafter locking the pallet rigidly in a precise position in the work station during the performance of an operation on the workpiece on such pallet, said means comprising a stop located along said path adjacent said work station, means (a) for causing said stop to move into said path to engage each pallet approaching said work station; (b) for then enabling said stop to move generally along said path through a limited distance to stop the pallet in the work station; (c) for then causing said stop to move further into said path to fixture the pallet in the work station; (d) for then causing said stop to move out of said path of release the pallet for movement out of the work station; and (e) for then causing said stop to move generally along said path in a direction opposit to the direction of travel of the pallet, and means for resisting movement of said stop through said limited distance whereby said stop causes each pallet to gradually decelerate as the pallet approaches the work station and then holds the pallet in the work station.

2. Apparatus for handling workpieces and comprising a row of pallets each adapted to hold a workpiece, a continuously driven power-and-free conveyor, said conveyor being operable to advance said pallets along a predetermined path through a work station and being operable to allow said pallets to dwell along said path when the pallets are stopped during continued driving of said conveyor, said apparatus being characterized by a stop located along said path adjacent said work station, means (a) for causing said stop to move into said path to engage each pallet approaching said work station; (b) for then enabling said stop to move generally along said path through a limited distance in the direction of travel of the pallet to stop the pallet in the work station; (c) for then causing said stop to move further into said path to fixture the pallet in the work station; (d) for then causing said stop to move out of said path to release the pallet for movement out of the work station; and (e) for then causing said stop to move generally along said path in a direction opposite to the direction of travel of the pallet, and means for resisting movement of said stop through said limited distance whereby said stop causes each pallet to gradually decelerate as the pallet approaches the work station and then holds the pallet in the work station while an operation is performed on the workpiece on such pallet.

3. Apparatus as defined in claim 2 in which said means for causing said movements (a), (c) and (d) comprise a single reversible fluid-operated actuator.

4. Apparatus as defined in claim 3 in which said actuator comprises a cylinder and further comprises a piston slidable in one direction in the cylinder when one end of the cylinder is pressurized and slidable in the opposite direction in the cylinder when the other end of the cylinder is pressurized, and means for shifting said piston to a predetermined neutral position in said cylinder when both ends of said cylinder are de-pressurized.

5. Apparatus as defined in claim 3 in which said means for resisting movement of said stop through said limited distance comprise a fluid-operated actuator having a reciprocable piston operably associated with said stop, said last-mentioned actuator causing said movement (e).

6. Apparatus for handling workpieces are comprising a row of pallets each adapted to hold a workpiece, each of said pallets having a locator thereon, continuously driven power-and-free conveyor means, said conveyor means being operable to advance said pallets along a predetermined path through a work station and being operable to allow said pallets to dwell along said path when the pallets are stopped during continued driving of said conveyor means, said apparatus being characterized by a stop located along said path adjacent said work station, said stop having a locator which is complementary to and is adapted to interfit with the locator on each of said pallets, means (a) for causing said stop to move into said path to engage each pallet approaching said work station; (b) for then enabling said stop to move generally along said path through a limited distance in the direction of travel of the pallet to stop the pallet in the work station; (c) for then causing said stop to move to a fixturing position causing the locator of the stop to interfit with the locator of the pallet and lock the pallet rigidly in a precisely fixed location in the work station; (d) for then causing said stop to move out of said fixturing position and out of said path to release the pallet for movement out of the work station; and (e) for then causing said stop to move generally along said path in a direction opposite to the direction of travel of the pallet, and means for resisting movement of said stop through said limited distance whereby said stop causes each pallet to gradually decelerate as the pallet approaches the work station.

7. Apparatus as defined in claim 6 in which the locator on each of said pallets comprises a socket formed in said pallet, the locator of said stop comprising a bar sized to dowel slidably but tightly into said socket.

8. Apparatus as defined in claim 7 in which said socket includes a closed end and in which said bar includes a free end, the free end of said bar pressing against the closed end of said socket when said stop is in said fixturing position.

9. Apparatus as defined in claim 6 further including means independent of said pallets for rigidly locking said stop against movement in both directions along said path when said stop is in said fixturing position.

10. Apparatus as defined in claim 6 in which said means for enabling movement of said stop comprise a base, a slide mounted on said base for back and forth movement transversely of said path, a carrier mounted on said slide to move in unison with said slide and also to move relative to said slide generally along said path, said stop being movable with said carrier.

11. Apparatus as defined in claim 10 in which said carrier is mounted to pivot on said slide.

12. Apparatus as defined in claim 11 further including means for moving said slide back and forth on said base and for pivoting said carrier back and forth on said slide.

13. Apparatus as defined in claim 6 in which said means for resisting movement of said stop comprise a fluid-operated actuator having a cylinder and having a piston slidable in said cylinder, said piston operably engaging said stop as said stop is moved through said limited distance, and means for pressurizing said cylinder during the time said stop is moved through said limited distance thereby to produce a pressurized fluid cushion resisting movement of said piston.

14. Apparatus as defined in claim 13 further including means for effecting de-pressurization of said cylinder during the interval existing just prior to the time said stop is moved into said fixturing position until just after the time said stop is moved out of said fixturing position.

15. Apparatus as defined in claim 14 in which said cylinder is pressurized just after said stop moves out of said path whereby said piston acts to move said stop in a direction opposite to the direction of travel of said pallets.

16. Apparatus as defined in claim 6 further including a track along which said pallets are moved by said conveyor means, complementary guides on said track and said pallets and interfitting with one another to cause said pallets to move along said path, said stop pressing the guide on each pallet tightly against the guide on said track when the pallet dwells in said work station and the stop is in said fixturing position.

17. Apparatus as defined in claim 6 in which each of said pallets includes a lip extending along said path and projecting toward said conveyor means, said conveyor means comprising a series of spaced clamps for tightly gripping the lips of said pallets to advance said pallets along said path, said clamps slipping frictionally along the lip of each pallet when the pallet is stopped in said work station.

18. Apparatus as defined in claim 17 in which each of said clamps comprises a pair of opposing jaws with at least one of said jaws being movable toward and away from the other jaw, and means for resiliently biasing said one jaw of each clamp toward the other jaw thereof.

* * * * *